United States Patent [19]

Arnau

[11] Patent Number: 4,565,900

[45] Date of Patent: Jan. 21, 1986

[54] LIGHTNING ROD CONSTRUCTION

[76] Inventor: Angel I. Arnau, Terrassa, Cardoner, 4 Barcelona, Spain

[21] Appl. No.: 650,726

[22] Filed: Sep. 14, 1984

[30] Foreign Application Priority Data

Sep. 19, 1983 [ES] Spain ................................. 526264

[51] Int. Cl.$^4$ ........................................... H02G 13/00
[52] U.S. Cl. ..................................... 174/3; 174/4 R; 361/231
[58] Field of Search ............... 174/2, 3, 4 R; 361/220, 361/222, 230, 231

[56] References Cited

U.S. PATENT DOCUMENTS 4,139,879  2/1979  Laws .................................... 361/230
4,480,146 10/1984  Invernizzi ....................... 174/4 R X

FOREIGN PATENT DOCUMENTS 1203579  8/1959  France ............................... 174/4 R Primary Examiner—Laramie E. Askin
Attorney, Agent, or Firm—Holman & Stern

[57] ABSTRACT

A lightning rod structure comprises a steel rod for connection to the ground, the rod extending upwardly from a central hub, and the structure further including an accelerator associated with the hub. The accelerator includes upper metal deflector arms radiating from the hub and each formed with a series of holes, and further arms of dielectric material radiating from the hub below the deflector arms. The further arms carry upwardly extending exciter needles centered on the holes in the upper arms. In use, a potential difference is created between the rod which is positively charged and the needles which become negatively charged.

4 Claims, 3 Drawing Figures

LIGHTNING ROD CONSTRUCTION

BACKGROUND OF THE INVENTION

This invention relates to lightning rod structures and provides improvements offering a lightning rod a more reliable attraction of high voltage atmospheric electrical discharges giving greater security to its users and the facilities it protects. In order to understand the state of present lightning rod construction technology, the following is a description of how the electrical discharge, which must be attracted towards the lightning rod, is formed in a storm cloud cell.

Experience shows that the phenomenon of the formation of electrical discharges is due to the accumulation of electrically charged drops of water inside a storm cloud cell.

The distribution of the charges inside the cloud cell is not random or unordered, but shown experimentally that the negative charges gather in the lower and central regions of the cloud while all the upper portion is positive. From this it can be said that a storm cloud cell is like an enormous electrostatic charge generator.

A discharge is produced when an electric field is formed in the layer of air between the cloud cell and the ground. The cloud's lower surface and the ground immediately below it behave like the plates of an enormous condenser whose dielectric is the intervening layer of air. The earth's surface is positively charged by induction.

From the lower portion of the cloud, where the negative charge is greater, charges begin to move along a branched tortuous path, sometimes several paths at one time. This process is silent and faintly luminous. As the extremes of these paths approach the earth, they induce a large concentration of positive charges. A highly concentrated electrical discharge occurs from a point on the ground towards the end of the path.

The junction of the ground positive charges and the negative ones from the cloud occurs at a height of 15–50 meters, this discharge being highly luminous and producing thunder. It is at this moment that the current flow is greatest.

Any building protection system must be designed so as to be able to handle this current. Until now, the only protection known and used predominantly has been the "Franklin" type rod or a radio-active one. The principles of both types are in the public domain and together form what can be considered as the state of lightning rod technology.

The construction of radio-active lightning rods came as the result of the necessity for a lightning rod that impeded the formation of atmospheric electrical discharges, something which Franklin type rods could not do. The preventative action of radio-active rods was due to an artifical excitation of the atmosphere producing a greater flow of positive ions than that produced by Franklin type rods. The aim of this flow of ions was to neutralize the electrical charge in the cloud.

However, the construction and installation of radio-active rods has inherent legal and security problems. Precautions must be taken in the handling of radio-active material.

SUMMARY OF THE INVENTION

An object of the present invention is to improve a lightning rod's attractive power to atmospheric discharges by the incorporation of a series of constructional improvements making a lightning rod more efficient while overcoming the aforementioned inconveniences.

The construction of a proportional action lightning rod, subject of the present invention, includes an atmospheric accelerator on a dielectric support which greatly increases the amount of electricity that a lightning rod is capable of dispersing into the atmosphere, this action of electrical preparation of the atmosphere increasing the attraction of a discharge which is then led to ground through a conventional grounding system.

The lightning rod is constructed by firstly joining both mechanically and electrically a conventional pointed stainless steel rod to a copper cable that connects the rod to ground. The rod is therefore at a positive potential.

This rod is screw mounted on a base upon which in turn the other components are located. The base is surrounded by a stainless steel cylinder which, together with upper and lower covers, protects the whole unit from atmospheric conditions. The base supports the accelerator consisting of a radial metallic deflector with various arms each having drilled holes. These arms are screw mounted on the base and electrically connected to the central rod. The whole deflector has a positive potential.

The actual atmospheric accelerator is now mounted. This is made up of a dielectric material comprising radial arms screw mounted onto the base. The arms support small needles or exciters fixed to the dielectric material so that they point to the center of the holes drilled in the deflector, the distribution of the holes and the exciters being radial. The exciters, being mounted on a dielectric, are always at atmospheric potential which, according to the above explanation, is negative.

As both the central rod and the deflectors have a positive potential and the exciters a negative one, a potential difference is created. This potential difference is greater, the higher the atmospheric potential gradient, that is, the closer the formation of lightning.

The potential difference greatly accelerates the ions and electrons between the two elements to the point where they provoke collision or chain ionization and thus an ion flow towards the cloud. The main characteristic constructional improvement of the lightning rod is the production of a more intense ionization, as the probability of lightning formation increases. This aspect is called "proportional action".

DESCRIPTION OF PREFERRED EMBODIMENT

Figure 1:
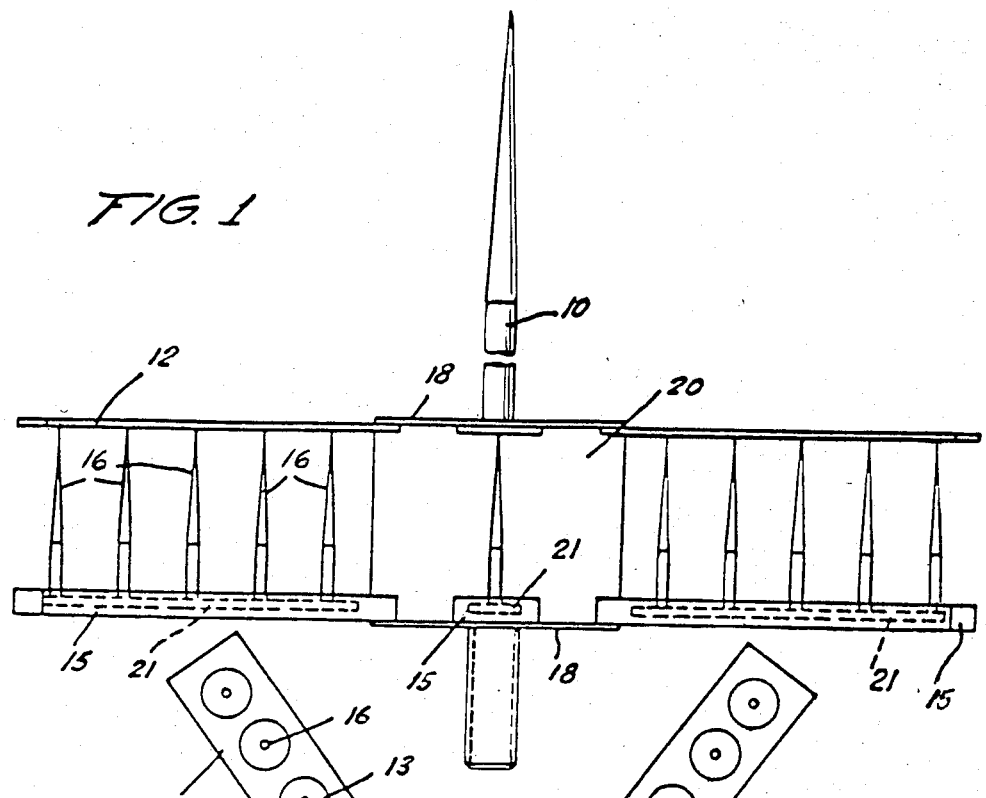
FIG. 1 is an elevational view of a lightning rod structure in accordance with the invention.
Figure 2:
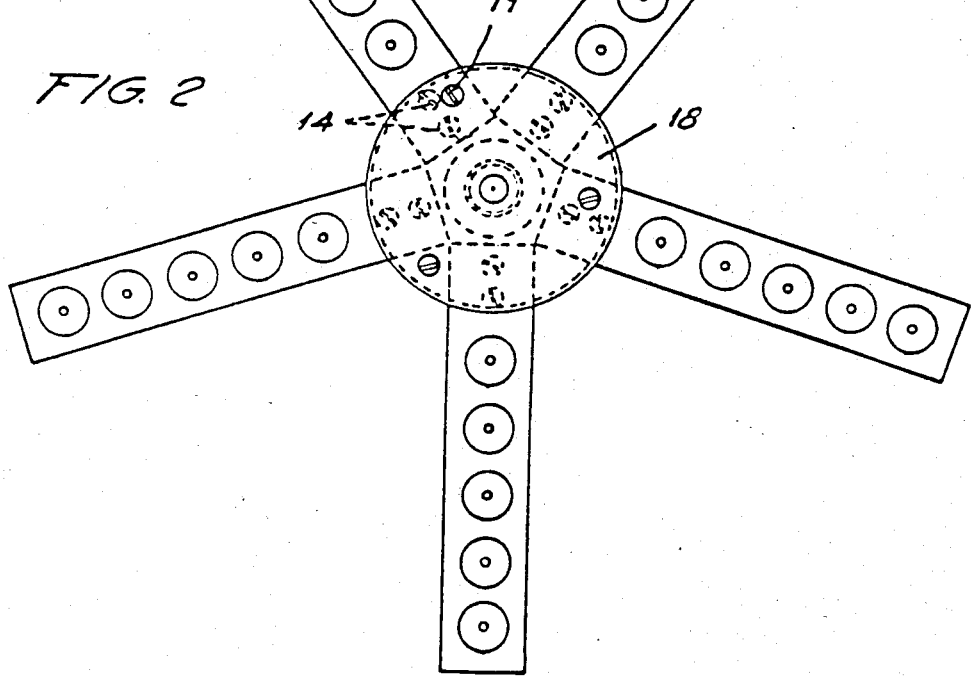
FIG. 2 is a plan view of the structure.
Figure 3:
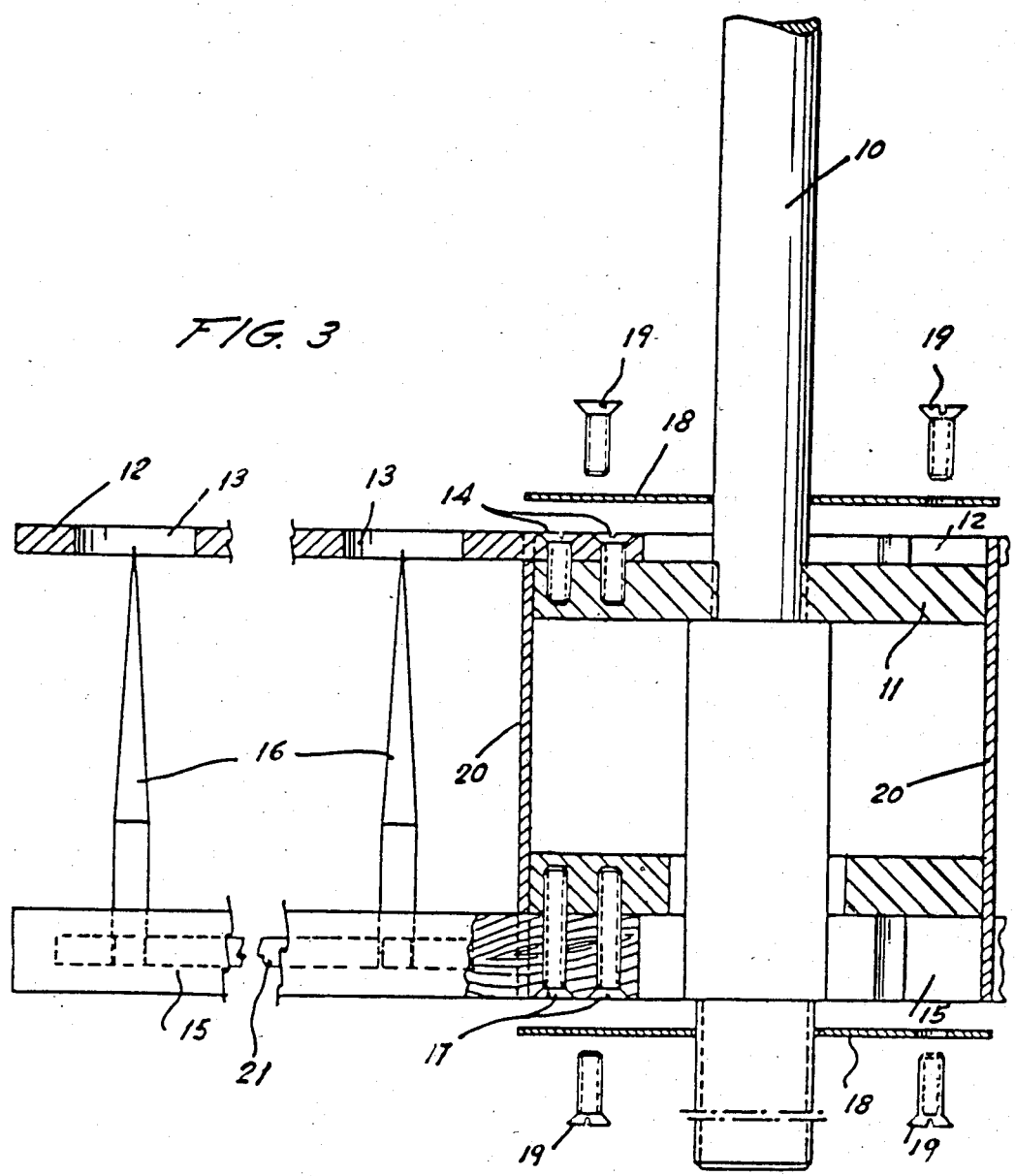
FIG. 3 is an enlarged sectional elevational view of a portion of the structure.

As can be seen in FIGS. 1 and 2, the construction of a lightning rod is begun by mounting a central mast 10 on an upper plate 11 of a central hub. The hub is surrounded by an open-ended cylinder 20. Deflecting plates 12 in the form of radial arms are mounted on the upper plate 11.

The deflecting plates have holes 13 drilled in them and are distributed radially and held in position by screws 14. A dielectric accelerator is made up of plates 15 in the form of radial arms of dielectric material, on each of which small needles 16 centered on the holes 13 are interconnected by a metal plate 21. The accelerators are radially distributed and fixed to a lower base plate of the hub by screws 17. Upper and lower covers 18 are fixed to the hub outside the arms 12 and 15 by screws 19, these together with cylinder 20 providing weather protection.

From the above, it may be appreciated that electrical preparation of the atmosphere is achieved irrespective of the number of needles on the accelerator, and the length, shape number and holes in the deflectors.

While only a preferred embodiment of the invention is described herein in detail, the invention is not limited thereby and modifications may be made if within the scope of the attached claims.

I claim:

1. A lightning rod structure comprising a steel rod for electrical connection to the ground, the rod extending upwardly from a central hub, the structure further including an accelerator comprising plural metallic deflector arms extending radially from the hub, each arm having a series of holes therethrough and being electrically connected to the rod, further arms of dielectric material radially extending from the hub below the respective deflector arms, the further arms supporting upright exciter needles centered substantially on the respective holes in the deflector arms.

2. The invention of claim 1 wherein the exciter needles are interconnected by metal plates carried by the respective further arms and wherein the height of the needles corresponds substantially to the spacing between the deflector arms and the further arms.

3. The invention of claim 1 wherein the central hub comprises upper and lower plates surrounded by a protective cylinder, the deflector arms being connected to the upper plate and the further arms being connected to the lower plate.

4. The invention of claim 3 wherein the upper and lower plates have protective covers.

* * * * *